(12) United States Patent
Lee et al.

(10) Patent No.: US 8,580,898 B2
(45) Date of Patent: *Nov. 12, 2013

(54) COPOLYMER POLYESTER RESIN AND MOLDED PRODUCT USING SAME

(75) Inventors: Myoung Ruoul Lee, Seoul (KR); Jong Ryang Kim, Gyeonggi-do (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 164 days.

This patent is subject to a terminal disclaimer.

(21) Appl. No.: 13/130,606

(22) PCT Filed: Nov. 20, 2009

(86) PCT No.: PCT/KR2009/006855
§ 371 (c)(1),
(2), (4) Date: May 23, 2011

(87) PCT Pub. No.: WO2010/062083
PCT Pub. Date: Jun. 3, 2010

(65) Prior Publication Data
US 2011/0224400 A1    Sep. 15, 2011

(30) Foreign Application Priority Data
Nov. 28, 2008  (KR) .................. 10-2008-0119622

(51) Int. Cl.
*C08F 16/10* (2006.01)
*C08F 216/10* (2006.01)
*C08F 16/36* (2006.01)
*C08F 218/14* (2006.01)
*C08F 218/16* (2006.01)
*C08F 222/10* (2006.01)

(52) U.S. Cl.
USPC .................. 525/328.8; 525/328.6; 525/329.5; 525/330.1; 528/220; 528/272; 264/45.1; 264/45.9; 264/232; 264/239

(58) Field of Classification Search
USPC ........ 528/220, 272; 264/45.1, 45.9, 232, 239; 525/328.8, 328.6, 329.5, 330.1
See application file for complete search history.

(56) References Cited

U.S. PATENT DOCUMENTS 6,942,831 B2    9/2005   Greener et al.

FOREIGN PATENT DOCUMENTS

| JP | 2008-274074 | 11/2008 |
| JP | 2008-274180 | 11/2008 |
| KR | 10-2006-0038666 | 5/2006 |
| KR | 10-2008-0043587 | 5/2008 |
| WO | WO 2007-091082 | 8/2007 |

OTHER PUBLICATIONS

U.S. Appl. No. 13/130,629 claims.*
U.S. Appl. No. 13/130,642 claims.*
International Search Report dated Jun. 28, 2010 in PCT/KR2009/006855.
Chinese Search Report, dated Aug. 27, 2012 in CN200980147961.2.

* cited by examiner

Primary Examiner — Duc Truong
(74) Attorney, Agent, or Firm — Richard M. Klein; Fay Sharpe LLP

(57) ABSTRACT

The present invention relates to a copolymer polyester resin and a molded product using the same, and more specifically to a copolymer polyester resin that contains 10~80 mol % of 1,4-cyclohexane dimethanol, 0.1~50 mol % of a diol compound expressed as $HO—(CH_2)_a—CO—(CH_2)_b—OH$ (where a and b are integers in the range 1~5), and ethylene glycol or other diols so that the sum of its entire diol composition is 100 mol % based on dicarboxylic acid. The copolymer polyester resin of the present invention enables reduction of cycle time, improvement of product processability and prevention of PET bottle deformation during mold processing with a heat-shrinking label by complementing low temperature shrinkage, maintaining a high shrinkage rate, and reducing shrinkage stress.

15 Claims, No Drawings

COPOLYMER POLYESTER RESIN AND MOLDED PRODUCT USING SAME

TECHNICAL FIELD

The present invention relates to a copolymer polyester resin and a molded product using the same, and more particularly, to a copolymer polyester resin, which enables the reduction of cycle time and the improvement of product processability during mold processing with a heat-shrinking label and is thus remarkably suitable for use in labels, and to a molded product using the same.

BACKGROUND ART

Heat shrinkable plastic products have the property of shrinking when heated and are widely utilized for films such as shrink packages, shrink labels, etc. In particular, polyvinyl chloride (PVC), polystyrene, and polyester based plastic films have been used to label or cap seal a variety of vessels or to directly package them.

However, films made of PVC are subject to environmental restrictions because their incineration may generate hydrogen chloride gas and a dioxin-causing material. If this product is used as a shrink label of a PET vessel, the recycling of the vessel can be carried out only after the cumbersome separation of the label and the vessel from each other.

Also, polystyrene based films may be very stably worked when undergoing the shrinking process and have a good external appearance, but have poor chemical resistance, undesirably requiring that an ink having a specific composition be used for printing. Furthermore, this film is problematic because it shrinks spontaneously because of poor storage stability at mom temperature, undesirably deforming the dimensions thereof.

Films made of polyester resin without such problems are receiving considerable attention as a shrink label while substituting for the films made of the above two materials. Moreover, as the use of PET vessels increases, polyester films which may be easily regenerated without the need to separately remove the label upon recycling of the vessels are being increasingly used.

However, the shrinking properties of conventional heat-shrinking polyester films must be improved. Because of drastic changes in shrinkage behavior, these films may wrinkle or shrink non-uniformly, undesirably causing frequent problems during a molding process of their shape deviating from an intended design. Also, compared to PVC based films or polystyrene based films, polyester films have relatively higher maximum shrinkage rate but are poor in terms of shrinkability at low temperature, and thus should be shrunk only at high temperature. Furthermore, because polyester has high heat shrinkage stress, PET vessels are undesirably deformed or becomes white turbid.

DISCLOSURE

Technical Problem

Accordingly, the present invention has been devised to solve the problems encountered in the related art, and is intended to provide a copolymer polyester resin, which may complement poor low-temperature shrinkability and may reduce shrinkage stress while maintaining a high shrinkage rate, and a heat-shrinking film including the same.

Technical Solution

An aspect of the present invention provides a copolymer polyester resin, which contains 10~80 mol % of 1,4-cyclohexane dimethanol, 0.1~50 mol % of a diol compound represented by Formula 1 below, and ethylene glycol or other diols so that the sum of the entire diol composition is 100 mol % based on a dicarboxylic acid.

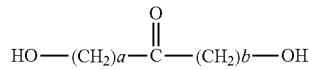

[Formula 1]

wherein a, b are an integer of 1~5.

Another aspect of the present invention provides a molded product, produced by extruding or ion molding the copolymer polyester resin.

Advantageous Effects

According to the present invention, a copolymer polyester resin includes a diol comprising an alkane based derivative having a specific ketone group, so that the shrinkage initiation temperature of the copolymer polyester resin is lowered, thus enabling heat shrinkage at low temperature similar to that of PVC and reducing shrinkage stress while maintaining a high shrinkage rate which is a characteristic of a polyester film, thereby preventing deformation or white turbidity of a PET vessel which conventionally resulted upon heat shrinking of a film. Furthermore, the shrinkage speed can be easily controlled, thus reducing molding defects.

BEST MODE

According to an embodiment of the present invention, a copolymer polyester resin contains 10~80 mol % of 1,4-cyclohexane dimethanol, 0.1~50 mol % of a diol compound represented by Formula 1 below, and ethylene glycol or other diols so that the sum of the entire diol composition is 100 mol % based on a dicarboxylic acid.

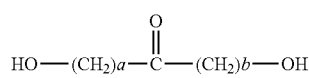

[Formula 1]

wherein a, b are an integer of 1~5.

Hereinafter, a detailed description will be given of the present invention.

Upon preparation of a copolymerized polyester resin containing 1,4-cyclohexane dimethanol according to the present invention, a diol which is an alkane based derivative having a ketone group is used to substitute for a portion of the diol composition, so that the resulting copolymer polyester resin has sufficient processability to produce a film which may be subjected to heat shrinkage at low temperature and also may have reduced shrinkage stress while maintaining a high shrinkage rate of a polyester film. Also, the present invention provides a molded product using such a polyester resin.

According to the present invention, the copolymer polyester resin is prepared by esterification in the first step and polycondensation in the second step.

In the first step, esterification may be performed in batch or continuous process, and respective materials may be separately added, but addition of dicarboxylic acid in a slurry form to the diol composition is very favorable.

In the present invention, 1,4-cyclohexane dimethanol is used to enhance processability or other properties of a homopolymer composed exclusively of terephthalic acid and ethylene glycol. In the present invention, 1,4-cyclohexane dimethanol may include cis-isomer, trans-isomer, or a mixture of two isomers, and may be used in an amount of 10~80 mol % based on the total amount of the entire diol composition in order to prevent processability from deteriorating due to crystallization.

Used in the present invention, the diol comprising an alkane based derivative having a ketone group is a diol compound represented by Formula 1, and this compound may be selected from the group consisting of 1,3-dihydroxy-2-propanone, 1,3-dihydroxy-2-butanone, 1,3-dihydroxy-2-pentanone and mixtures thereof, and is used to enhance low-temperature shrinkability, maintain a heat shrinkage rate and reduce shrinkage stress.

The diol compound represented by Formula 1 may be used in an amount of 0.1~50 mol % based on the total amount of the entire diol composition. If the amount of diol compound is less than 0.1 mol %, it is difficult to improve the properties by the addition of the diol of Formula 1. In contrast, if the amount thereof exceeds 50 mol %, the resulting film may have remarkably decreased heat resistance and reduced shrinkage stress undesirably decreasing its usability as a heat-shrinking film.

When the diol compound represented by Formula 1 is used in the present invention, the heat-shrinking film may have a lowered shrinkage initiation temperature and thus may reduce the cycle time when passing through a steaming process, resulting in improved productivity. Also, because the shrinkage speed is slow upon low-temperature shrinking, efficient process control is possible, advantageously decreasing the defective rate.

As one of the diol composition, ethylene glycol may be added so that the sum of the entire diol composition is 100 mol % taking into consideration the amounts of 1,4-cyclohexane dimethanol and diol represented by Formula 1.

The diol composition according to the present invention may further include one or more diols as below depending on the needs. Examples of usable diols include propane-1,2-diol, 2,2-methyl-1,3-propanediol, 2-methyl-1,3-propanediol, 2-dimethyl-1,3-propanediol, 2-methyl-2-ethyl-1,3-propanediol, 2-methyl-isopropyl-1,3-propanediol, 2-methyl-2-n-propyl-1,3-propanediol, 1,1-ethyl-n-butyl-1,3-propanediol, 2-n-propyl-2-n-butyl-1,3-propanediol, 2,2-di-n-propyl-1,3-propanediol, 2-ethyl-n-propyl-1,3-propanediol, 2-ethyl-isopropyl-1,3-propanediol, 2-methyl-n-butyl-1,3-propanediol, 2,2-diethyl-1,3-propanediol, 1,4-butanediol, 2,3-dimethyl-1,4-butanediol, 2-methyl-1,4-butanediol, 2-ethyl-1,4-butanediol, 2,3,4-trimethyl-1,5-pentanediol, 2-methyl-2-hexyl-1,3-propanediol, 2-butyl-2-ethyl-1,3-propanediol, 3-methyl-1,5-pentanediol, 2-methyl-1,5-pentanediol, 2-methyl-2-hexyl-1,3-propanediol, 2,3-dimethyl-2,3-butanediol, 1,6-hexanediol, dimer diol or ether glycol, including polyethylene glycol such as diethylene glycol or triethylene glycol, polypropylene glycol, polyoxytetramethylene glycol, and an alkylene oxide of a bisphenol compound or its derivative, or mixtures thereof This component may be used so that the sum of the entire diol composition is 100 mol % considering the amounts of 1,4-cyclohexane dimethanol, diol of Formula 1, and ethylene glycol.

Esterification needs no catalyst, but a catalyst may be optionally added in order to shorten the reaction time.

After the completion of esterification in the first step, a second step of polycondensation is carried out. Typically useful upon polycondensation of the polyester resin, a polycondensation catalyst, a stabilizer and a coloring agent may be selectively used.

Usable in the present invention, the polycondensation catalyst is titanium, germanium, and antimony compounds, but the present invention is not limited thereto.

The titanium based catalyst is generally used as a polycondensation catalyst of a copolymer polyester resin prepared by using 15 wt % or more of 1,4-cyclohexane dimethanol based on the weight of terephthalic acid. Even when the titanium based catalyst is used in an amount smaller than the amount of an antimony based catalyst, the reaction may take place. Also, the price of a titanium based catalyst is lower than that of a germanium based catalyst.

Examples of the titanium based catalyst usable in the present invention may include tetraethyl titanate, acetyltripropyl titanate, tetrapropyl titanate, tetrabutyl titanate, tetrabutyl titanate, polybutyl titanate, 2-ethylhexyl titanate, octyleneglycol titanate, lactate titanate, triethanolamine titanate, acetylacetonate titanate, ethylacetoacetic ester titanate, isostearyl titanate, titanium dioxide, coprecipitates of titanium dioxide and silicon dioxide, and coprecipitates of titanium dioxide and zirconium dioxide.

The amount of the polycondensation catalyst, which affects the color of a final polymer, may vary depending on a desired color and the kind of stabilizer and coloring agent. The polycondensation catalyst may be used in the amount of 1~100 ppm of the titanium element based on the weight of the final polymer, and particularly in the amount of 1~50 ppm of the titanium element, and is used in the amount of 10 ppm or less of the silicon element.

Also, a stabilizer and a coloring agent may be used as additional additives.

The stabilizer usable in the present invention may include phosphoric acid, trimethyl phosphate, triethyl phosphate and triethyl phosphonoacetate, and may be used in the amount of 10~100 ppm of a phosphorus element based on the weight of the final polymer.

The coloring agent usable to improve the color in the present invention may include a typical coloring agent such as cobalt acetate and cobalt propionate, and may be used in the amount of 0~100 ppm based on the weight of the final polymer.

In addition to the above examples of the coloring agent, any organic compound may be used so long as it is conventionally known.

After the addition of these components, polycondensation in the second step may be carried out at 260~290° C. under a reduced pressure of 400~0.1 mmHg, but the present invention is not limited thereto.

Polycondensation is carried out for the period of time required to reach the desired intrinsic viscosity, and the reaction temperature thereof is set to 260~290° C., particularly 260~280° C., and more particularly 265~275° C.

Also, polycondensation is carried out under a reduced pressure of 400~0.1 mmHg to eliminate a diol produced as a by-product, thereby obtaining the copolymer polyester resin containing 1,4-cyclohexane dimethanol.

As mentioned above, because the copolymer polyester resin according to the present invention has a low shrinkage initiation temperature and thus a slow shrinkage speed, efficient process control is possible, thereby exhibiting a processability sufficiently high that defective rates are reduced. Hence, the copolymer polyester resin is molded by extrusion/injection and stretching, so that a molded product such as a heat-shrinking film having high processability can be obtained.

The molded product according to the present invention has a shrinkage initiation temperature of 70° C. or lower, in particular 70° C. or lower but 40° C. or higher, and a maximum heat shrinkage rate at 70° C. of 2% or more, in particular 2% or more but less than 50%, and a maximum heat shrinkage rate at 85° C. of 50% or more. As above, the shrinkage initiation temperature is lowered, and thus heat shrinkage is possible at low temperature similar to the case of PVC, and also the shrinkage speed is easy to control, thus reducing molding defects. Furthermore, shrinkage stress within the shrinkage temperature range is lowered to a level similar to the case of PVC, thus preventing deformation or white turbidity of PET vessels which conventionally resulted upon heat shrinking of a general polyester film.

A better understanding of the present invention may be obtained in light of the following examples and comparative examples which are set forth to illustrate, but are not to be construed as limiting the present invention.

MODE FOR THE INVENTION

The properties in the examples and comparative examples were measured according to the following methods.

Glass Transition Temperature (Tg): Tg was measured using a differential scanning calorimeter available from TA Instrument.

Heat Shrinkage Rate: A sample was cut to a square shape having a size of 10 cm×10 cm, immersed in warm water at the temperature shown in Table 1 below under no load for 10 sec and thus heat shrunk, and then immersed in water at 25° C. for 10 sec, after which the length of the sample in longitudinal and transverse directions was measured and then substituted into the following equation.

Heat Shrinkage Rate(%)=100×(length before shrinkage−length after shrinkage)/(length before shrinkage)

Melt Resistivity (Ωcm): A pair of electrode plates were inserted into a chip or film melted at 275° C., and a voltage of 120 V was applied thereto. The current at that time was measured, after which the measured values were substituted into the following equation, thus determining the melt resistivity Si (Ωcm).

$Si=(A/I)\times(V/io)$ wherein A is the electrode area (cm), I is the distance (cm) between the electrodes, V is the voltage (V), and io is the current (A).

In the case where copolymer polyester was prepared using such a device, the following results could be obtained.

Shrinkage Stress (kgf): A film stretched four times in a transverse direction (TD) was cut to a rectangular shape having a size of 25 cm×0.15 cm, the ends of the film in the TD were fixed by a grip, and then the film was immersed in warm water at 85° C. The force shrinking of the TD by warm water was measured mechanically.

EXAMPLE

Example 1

In order to prepare a copolymer polyester resin, 183 g of 1,4-cyclohexane dimethanol, 511 g of ethylene glycol and 200 g of 1,3-dihydroxy-2-propanone, based on 6 mol terephthalic acid, were placed into a 3 l reactor equipped with a stirrer and a discharge condenser and mixed to carry out the reaction while the temperature therein was gradually increased to 255° C.

As such, generated water was discharged to the outside, so that esterification was carried out. After the completion of the generation and discharge of water, the resulting esterification product was transferred into a polycondensation reactor equipped with a stirrer, a cooling condenser and a vacuum system.

The esterification product was added with 0.5 g of tetrabutyl titanate, 0.4 g of triethyl phosphate and 0.5 g of cobalt acetate. While the internal temperature of the reactor was increased from 240° C. to 275° C., ethylene glycol was removed in a low vacuum atmosphere of 50 mmHg which was arrived at by decreasing from atmospheric pressure for 40 min. Subsequently, the pressure was gradually reduced to 0.1 mmHg to create a high vacuum atmosphere under which the reaction was carried out until the desired intrinsic viscosity was obtained. The reaction product was removed from the reactor and cut into the form of chips.

Using the copolymer polyester resin containing 1,4-cyclohexane dimethanol, a heat-shrinking film was produced and the glass transition temperature, shrinkage initiation temperature, heat shrinkage rate, melt resistivity and shrinkage stress thereof were measured according to the methods cited above. The results are shown in Table 1 below.

Example 2

A copolymer polyester resin was prepared in the same manner as in Example 1, with the exception that 200 g of 1,3-dihydroxy-2-butanone (in Formula 1 a=2) was added. Subsequently, a heat-shrinking film was produced therefrom, and the glass transition temperature, shrinkage initiation temperature, heat shrinkage rate, melt resistivity and shrinkage stress of the heat-shrinking film were measured. The results are shown Table 1 below.

Example 3

A copolymer polyester resin was prepared in the same manner as in Example 1, with the exception that 200 g of 1,3-dihydroxy-2-pentanone (in Formula 1 a=3) was added. Subsequently, a heat-shrinking film was produced therefrom, and the glass transition temperature, shrinkage initiation temperature, heat shrinkage rate, melt resistivity and shrinkage stress of the heat-shrinking film were measured. The results are shown in Table 1 below.

Comparative Example 1

A copolymer polyester resin was prepared in the same manner as in Example 1, with the exception that 1,3-dihydroxy-2-propanone was not added. A heat-shrinking film was then produced therefrom, and the glass transition temperature, shrinkage initiation temperature, heat shrinkage rate, melt resistivity and shrinkage stress of the heat-shrinking film were measured. The results are shown in Table 1 below.

Comparative Example 2

A copolymer polyester resin was prepared in the same manner as in Example 1, with the exception that 60 g of a diethylene glycol monomer was added instead of 1,3-dihydroxy-2-propanone. A heat-shrinking film was then produced therefrom, and the glass transition temperature, shrinkage initiation temperature, heat shrinkage rate, melt resistivity and shrinkage stress of the heat-shrinking film were measured. The results are shown in Table 1 below.

Comparative Example 3

A copolymer polyester resin was prepared in the same manner as in Example 1, with the exception that 920 g of 1,3-dihydroxy-2-propanone was added. A heat-shrinking film was then produced therefrom, and the glass transition temperature, shrinkage initiation temperature, heat shrinkage rate, melt resistivity and shrinkage stress of the heat-shrinking film were measured. The results are shown in Table 1 below.

Comparative Example 4

A heat-shrinking film was produced from a PVC resin, and the glass transition temperature, shrinkage initiation temperature, heat shrinkage rate, melt resistivity and shrinkage stress of the heat-shrinking film were measured. The results are shown in Table 1 below.

TABLE 1

|  | Ex. 1 | Ex. 2 | Ex. 3 | C.Ex. 1 | C.Ex. 2 | C.Ex. 3 | C.Ex. 4 |
|---|---|---|---|---|---|---|---|
| Glass Transition Temp. (Tg, ° C.) | 72 | 70 | 71 | 80 | 71 | 40 | 65 |
| Shrinkage Initiation Temp. (° C.) | 62 | 62 | 61 | 71 | 62 | 32 | 50 |
| Max. Heat Shrinkage Rate (at 60° C.) | 4% | 4% | 5% | 0% | 2% | 8% | 5% |
| Max. Heat Shrinkage Rate (at 85° C.) | 81% | 81% | 80% | 79 | 78% | 80% | 65% |
| Melt Resistivity (×10$^8$Ωcm) | 0.13 | 0.14 | 0.12 | 0.12 | 0.13 | 0.11 | 0.16 |
| Shrinkage Stress (kgf, at 85° C.) | 0.6 | 0.3 | 0.4 | 1.3 | 1.2 | 0.2 | 0.5 |

Although the embodiments of the present invention regarding the copolymer polyester resin and the molded product using the same have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

The invention claimed is:

1. A copolymer polyester resin, which contains 10-80 mol % of 1,4-cyclohexane dimethanol, 0.1-50 mol % of a diol compound represented by Formula 1 below, and ethylene glycol or other diols so that a sum of the entire diol composition is 100 mol % based on a dicarboxylic acid:

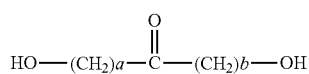

[Formula 1]

wherein a, b are an integer of 1-5.

2. The copolymer polyester resin of claim 1, wherein the diol compound represented by Formula 1 is one or more selected from the group consisting of 1,3-dihydroxy-2-propanone, 1,3-dihydroxy-2-butanone, 1,3-dihydroxy-2-pentanone, and mixtures thereof.

3. The copolymer polyester resin of claim 1, wherein the aromatic dicarboxylic acid is terephthalic acid.

4. A molded product made of a copolymer polyester resin which contains 10-80 mol % of 1,4-cyclohexane dimethanol, 0.1-50 mol % of a diol compound represented by Formula 1 below, and ethylene glycol or other diols so that a sum of the entire diol composition is 100 mol % based on a dicarboxylic acid:

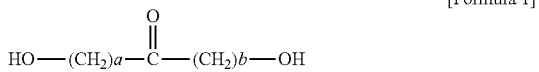

[Formula 1]

wherein a, b are an integer of 1-5;
wherein the molded product is a heat-shrinking film; and
wherein the molded product has a maximum heat shrinkage rate at 60° C. of 2% or more.

5. The molded product of claim 4, wherein the molded product has a shrinkage initiation temperature of 60° C. or lower.

6. The molded product of claim 4, wherein the molded product has a maximum heat shrinkage rate at 85° C. of 50% or more.

7. The molded product of claim 4, wherein the molded product has shrinkage stress at 85° C. of 1.0 kgf or less.

8. The molded product of claim 4, wherein the molded product is produced by extruding or injection molding.

9. The molded product of claim 4, wherein the diol compound represented by Formula 1 is one or more selected from the group consisting of 1,3-dihydroxy-2-propanone, 1,3-dihydroxy-2-butanone, 1,3-dihydroxy-2-pentanone, and mixtures thereof.

10. The molded product of claim 4, wherein the dicarboxylic acid is terephthalic acid.

11. The molded product of claim 4, wherein a and b are different.

12. The molded product of claim 4, wherein a and b are the same.

13. The molded product of claim 4, wherein the diol compound represented by claim 4, is 1,3-dihydroxy-2-propanone.

14. The molded product of claim 4, wherein the diol compound represented by claim 4, is 1,3-dihydroxy-2-butanone.

15. The molded product of claim 4, wherein the diol compound represented by claim 4, is 1,3-dihydroxy-2-pentanone.

* * * * *

UNITED STATES PATENT AND TRADEMARK OFFICE
CERTIFICATE OF CORRECTION

PATENT NO. : 8,580,898 B2  Page 1 of 1
APPLICATION NO. : 13/130606
DATED : November 12, 2013
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 161 days.

Signed and Sealed this
Twenty-second Day of September, 2015

Michelle K. Lee
*Director of the United States Patent and Trademark Office*